(12) United States Patent
Fuchigami

(10) Patent No.: US 8,184,910 B2
(45) Date of Patent: May 22, 2012

(54) IMAGE RECOGNITION DEVICE, IMAGE RECOGNITION METHOD, AND IMAGE SCANNING APPARATUS HAVING IMAGE RECOGNITION DEVICE

(75) Inventor: Takahiro Fuchigami, Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 699 days.

(21) Appl. No.: 12/400,039

(22) Filed: Mar. 9, 2009

(65) Prior Publication Data
US 2009/0238472 A1  Sep. 24, 2009

Related U.S. Application Data

(60) Provisional application No. 61/037,572, filed on Mar. 18, 2008.

(51) Int. Cl.
*G06K 9/62* (2006.01)
(52) U.S. Cl. ......... 382/209; 382/181
(58) Field of Classification Search ............ 382/209
See application file for complete search history.

(56) References Cited

U.S. PATENT DOCUMENTS

| | | | | |
|---|---|---|---|---|
| 5,577,135 A * | 11/1996 | Grajski et al. | ......... | 382/253 |
| 5,623,345 A * | 4/1997 | Merchant et al. | ......... | 358/407 |
| 5,625,717 A * | 4/1997 | Hashimoto et al. | ......... | 382/260 |
| 5,832,115 A * | 11/1998 | Rosenberg | ......... | 382/199 |
| 5,905,820 A * | 5/1999 | Cushman et al. | ......... | 382/299 |
| 6,091,841 A * | 7/2000 | Rogers et al. | ......... | 382/132 |
| 6,128,398 A * | 10/2000 | Kuperstein et al. | ......... | 382/118 |
| 6,229,521 B1 * | 5/2001 | Yip | ......... | 345/611 |
| 6,694,059 B1 * | 2/2004 | Zlotnick | ......... | 382/228 |
| 6,944,340 B1 * | 9/2005 | Shah | ......... | 382/187 |
| 6,961,465 B2 * | 11/2005 | Shah | ......... | 382/181 |
| 7,187,786 B2 * | 3/2007 | Kee | ......... | 382/118 |
| 7,403,643 B2 * | 7/2008 | Ianculescu et al. | ......... | 382/118 |
| 2002/0085756 A1 * | 7/2002 | Shah | ......... | 382/181 |
| 2003/0044068 A1 * | 3/2003 | Kagehiro et al. | ......... | 382/182 |
| 2004/0066538 A1 * | 4/2004 | Rozzi | ......... | 358/2.1 |
| 2005/0013486 A1 * | 1/2005 | Wiedemann et al. | ......... | 382/181 |
| 2005/0175251 A1 * | 8/2005 | Taketa et al. | ......... | 382/248 |
| 2006/0204105 A1 | 9/2006 | Fuchigami | | |
| 2007/0230793 A1 | 10/2007 | Fuchigami | | |
| 2008/0219506 A1 * | 9/2008 | Wiedemann et al. | ......... | 382/103 |
| 2008/0219555 A1 * | 9/2008 | Wiedemann et al. | ......... | 382/181 |
| 2011/0052062 A1 * | 3/2011 | Chiu et al. | ......... | 382/176 |
| 2011/0142348 A1 * | 6/2011 | Radhakrishnan et al. | ......... | 382/195 |

FOREIGN PATENT DOCUMENTS

| JP | 09-293082 | 11/1997 |
|---|---|---|
| JP | 2005-235089 | 9/2005 |

* cited by examiner

Primary Examiner — Sath V Perungavoor
(74) Attorney, Agent, or Firm — Turocy & Watson, LLP

(57) ABSTRACT

An image recognition device has a first resolution converter 202 that lowers resolution of an input image, an area reader 203 that reads out a processing area from an output of the first resolution converter 202, a second resolution converter 204 that lowers the resolution of the processing area sliced out by the area reader to be lower than in the first resolution converter 202, and a pattern comparator 205.

20 Claims, 11 Drawing Sheets

Fig. 6

|   |   |   |   |   |   |   |   |
|---|---|---|---|---|---|---|---|
| 2 | 8 | 7 | 10 | 9 | 3 | 2 | 1 |
| 4 | 16 | 10 | 15 | 14 | 7 | 4 | 3 |
| 4 | 7 | 10 | 16 | 16 | 12 | 9 | 12 |
| 7 | 14 | 13 | 6 | 12 | 7 | 11 | 13 |
| 9 | 11 | 10 | 9 | 15 | 4 | 13 | 11 |
| 3 | 7 | 11 | 13 | 14 | 15 | 8 | 7 |
| 2 | 4 | 8 | 10 | 11 | 6 | 5 | 6 |
| 0 | 2 | 3 | 7 | 8 | 4 | 4 | 3 |

Fig. 7

|   |   |   |   |
|---|---|---|---|
| 30 | 42 | 33 | 10 |
| 32 | 45 | 47 | 45 |
| 30 | 43 | 48 | 39 |
| 8 | 28 | 29 | 18 |

Fig. 8A

| 1 | 0 |
|---|---|
| 0 | 1 |

Fig. 8B

| 1 | 1 |
|---|---|
| 0 | 0 |

Fig. 8C

| 0 | −1 |
|---|---|
| 0 | 1 |

Fig. 8D

| 0 | 1 |
|---|---|
| 0 | 1 |

IMAGE RECOGNITION DEVICE, IMAGE RECOGNITION METHOD, AND IMAGE SCANNING APPARATUS HAVING IMAGE RECOGNITION DEVICE

CROSS-REFERENCE TO RELATED APPLICATION

This application is based upon and claims the benefit of priority from the prior U.S. Patent Application No. 61/037,572, filed on 18 Mar. 2008, the entire contents of which are incorporated herein by reference.

TECHNICAL FIELD

The present invention relates to an image recognition device and an image recognition method used for an image scanning apparatus such as a scanner, and an image scanning apparatus having the image recognition device.

BACKGROUND

An image scanning apparatus may have an image recognition device that determines whether a specific image is included in a scanned image or not. Such an image recognition device needs to have a high operation speed and high determination accuracy.

JP-A-9-293082 discloses an image recognition device that lowers resolution of an input image, then calculates a characteristic quantity such as average density, and searches for image data that is stored in advance, in accordance with the characteristic quantity.

However, the determination accuracy is lowered if the operation speed is increased, and the operation speed is lowered if the determination accuracy is increased. Therefore, there is a problem that an image recognition device having a high operation speed and high determination accuracy cannot be provided.

For example, if the operation speed is increased to a certain extent, the determination accuracy is lowered and the slice-out position of an image may be shifted as shown in FIG. 14.

There is also an image recognition device that reduces input image resolution to narrow down a search area and then compares the reduced-resolution image with a high-resolution input image that is stored in advance (see, for example, JP-A-2005-235089).

However, many memories are required in order to store the low-resolution image and the high-resolution image. There also is a problem that it is difficult to carry out signal processing by a hardware circuit such as ASIC since logical conditional branching is necessary when determining the search area narrowed down from the low-resolution image by specifying a high-resolution image area.

SUMMARY

It is an object of the present invention to provide an image recognition device including a first resolution converter, an area reader that reads out a processing area, a second resolution converter that lowers resolution more than the first resolution converter, and a pattern comparator.

In an aspect of the present invention, an image recognition device includes: a first resolution converter that lowers resolution of binarized image data; an area reader that reads out a processing area from an output of the first resolution converter; a second resolution converter that generates a processing pattern having lower resolution than in the first resolution converter, from the processing area read out by the area reader; a dictionary file that stores a dictionary pattern, which is pattern data of a specific image as a determination target; and a pattern comparator that sequentially reads out the dictionary pattern and compares the dictionary pattern with the processing pattern.

DESCRIPTION OF THE DRAWINGS

FIG. 6 is a view showing input data of a second resolution converter.

FIG. 7 is a view showing an exemplary output of the second resolution converter.

FIG. 8A is a view showing an exemplary processing pattern.

FIG. 8B is a view showing an exemplary dictionary pattern.

FIG. 8C is a view showing an exemplary difference calculated by a pattern comparator.

FIG. 8D is a view showing the result of squaring each pixel in FIG. 8C.

DETAILED DESCRIPTION

Throughout the description, the embodiments and examples shown should be considered as exemplars, rather than limitations on the apparatus and methods of the present invention.

Hereinafter, an embodiment of an image recognition device according to the invention will be described in detail with reference to the drawings.

Figure 1:
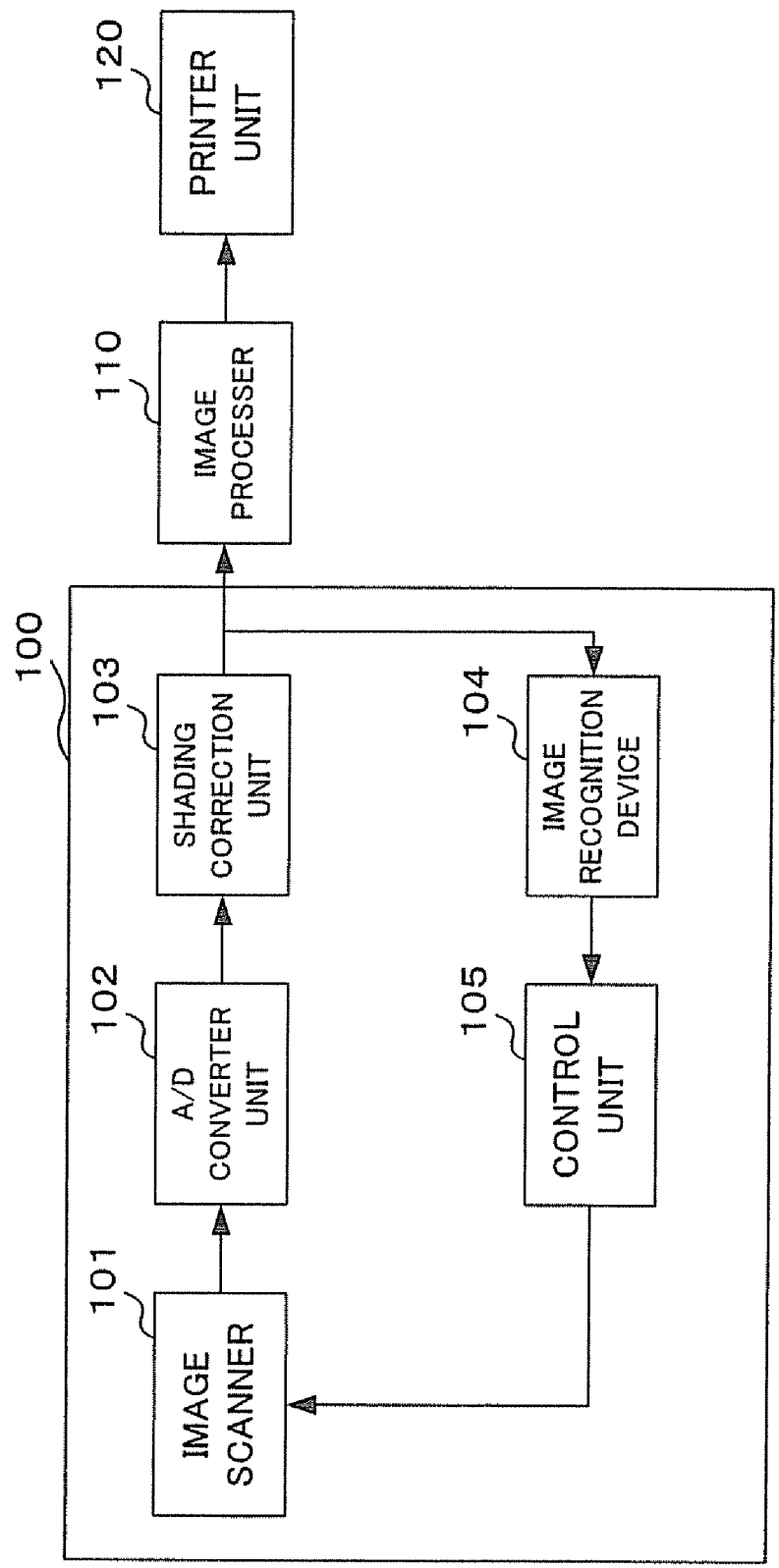
FIG. 1 is a block diagram showing the configuration of an image scanning apparatus including an image recognition device according to the invention.

FIG. 1 is a block diagram showing the configuration of an image scanning apparatus including the image recognition device. The image scanning apparatus may be a scanner. Alternatively, the image scanning apparatus may be an apparatus that determines image data generated from an image scanned by another device and then outputs the result of determination.

As shown in FIG. 1, an image scanning apparatus 100 has an image scanner 101 that converts an image taken therein by an optical technique, to an electric signal and outputs the electric signal, an analog-digital (A/D) converter unit 102 that performs analog-digital conversion of the signal from the image scanner 101 and outputs the digital signal, a shading correction unit 103 that corrects shading of the digitally converted image signal, an image recognition device 104 that takes the image data as its input and determines whether a specific image is included in the image data or not, and a control unit 105 that controls the operation of the image scanner 101 in accordance with the result of determination from the image recognition device 104.

The control unit 105 may perform control to suspend scanning or control to stop normal scanning.

The image scanning apparatus 100 can also be configured to output an output from the shading correction unit 103 to a printer unit 120 that forms an image, via an image processer 110 provided outside the image scanning apparatus 100.

Figure 2:
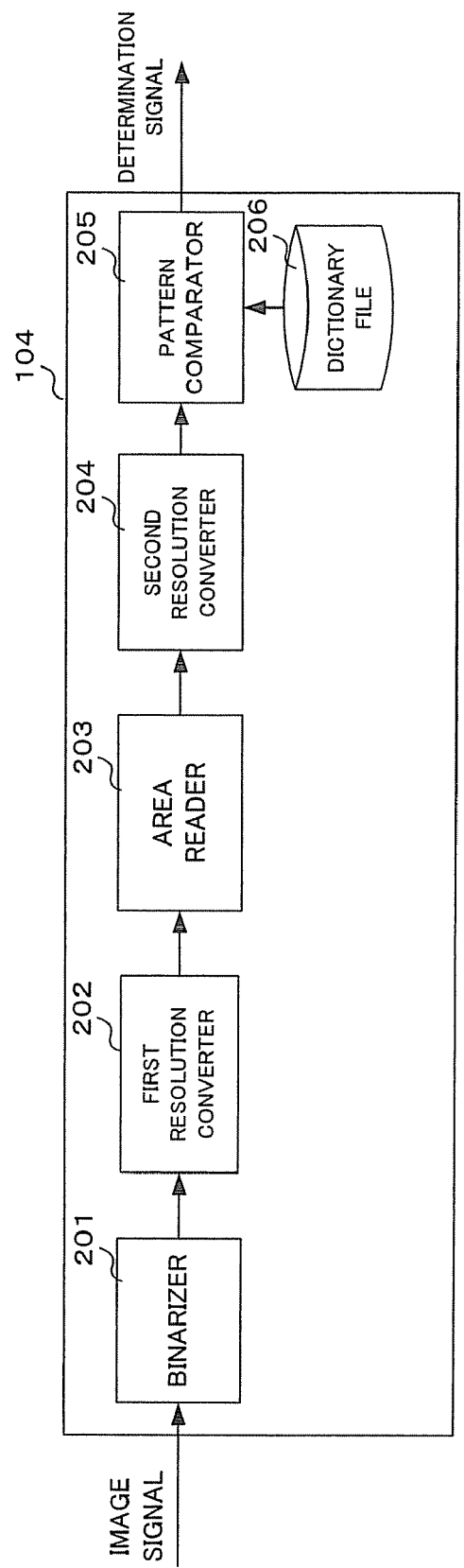
FIG. 2 is a block diagram showing the configuration of the image recognition device.

FIG. 2 is a block diagram showing the configuration of the image recognition device 104. As shown in FIG. 2, the image recognition device 104 has a binarizer 201 that binarizes an inputted image signal, a first resolution converter 202 that lowers resolution of the image signal, an area reader 203 that reads out a processing area from the image signal converted by the first resolution converter 202, and a second resolution converter 204 that converts the image data of the processing area outputted from the area reader 203 to lower resolution than the resolution at the first resolution converter 202 and then outputs the image data as a processing pattern.

The image recognition device 104 has a dictionary file 206 that stores a dictionary pattern, which is low-resolution data of a specific image pattern. The dictionary pattern stored in the dictionary file 206 may have the same size as the processing area with respect to the specific image pattern and may have the same resolution as the output from the second resolution converter 204.

The image recognition device 104 has a pattern comparator 205 that sequentially compares the processing pattern outputted from the second resolution converter 204 with the dictionary pattern read out from the dictionary file 206, in order to output a determination signal. The determination signal may be binary.

Figure 3:
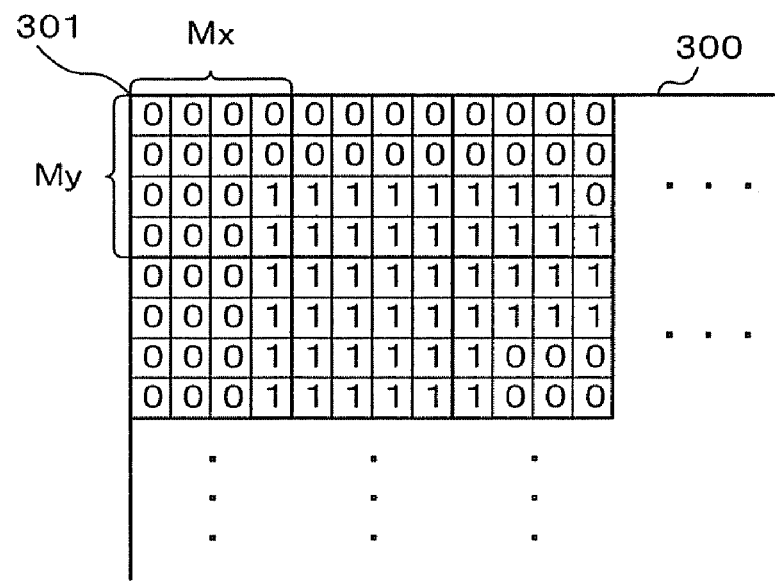
FIG. 3 is a view showing exemplary data before conversion by a first resolution converter.

FIG. 3 is a view showing exemplary data before conversion by the first resolution converter 202. As shown in FIG. 3, the binarizer 201 binarizes inputted image signals into "0" and "1" by using a threshold value. For example, "0" represents white and "1" represents black. The individual values binarized by the binarizer 201 are called pixels.

The first resolution converter 202 adds Mx pixels horizontally and My pixels vertically from the output of the binarizer 201 without overlap or omission, and thus calculates the sum. A set of Mx×My pixels is called a pixel block.

For example, if Mx=My=4, the first resolution converter 202 adds all the numeric values in a pixel block 301 and calculates the sum "2".

The first resolution converter 202 sequentially reads out Mx pixels each horizontally to calculate the sum. As the pixel at the right end is read out and the sum is found, the first resolution converter 202 returns to the left end and starts reading out pixels at the position vertically shifted by My pixels, and thus calculates the sum. The first resolution converter 202 repeats the above and calculates the sum of each pixel block in a processing area 300.

Figure 4:
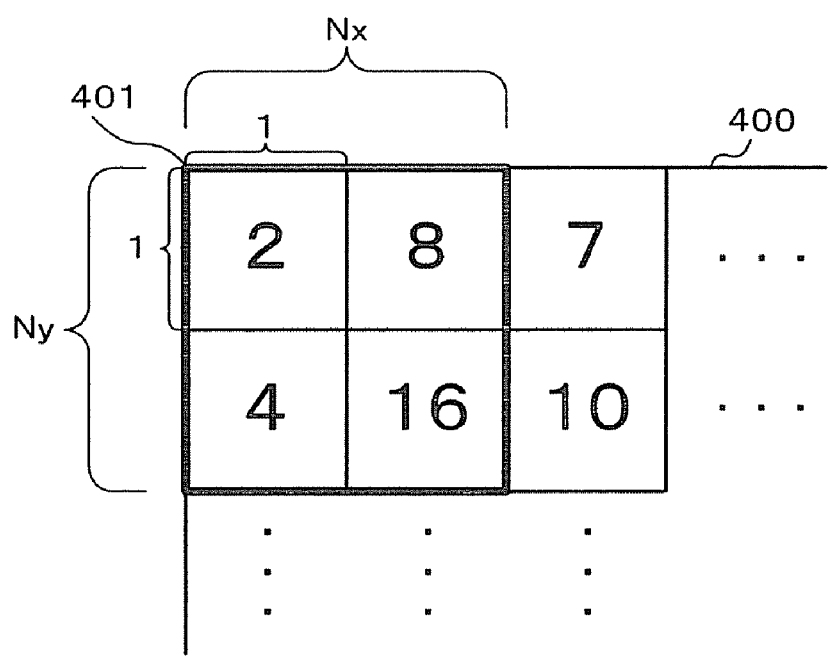
FIG. 4 is a view showing an exemplary output of the first resolution converter.

FIG. 4 is a view showing an exemplary output of the first resolution converter 202. As shown in FIG. 4, the first resolution converter 202 stores the sum "2" of the pixel block 301 into a buffer memory such as FIFO, as a pixel 401 to be outputted.

That is, the first resolution converter 202 replaces image data of 1 bit×16 pixels=16 bits, by data of 2 digits by decimal notation, that is, 5-bit data. Thus, the resolution of the inputted image data is lowered.

Nx and Ny represent the horizontal and vertical numbers of pixels used to calculate the sum when the second resolution converter 204 lowers resolution.

Figure 5:
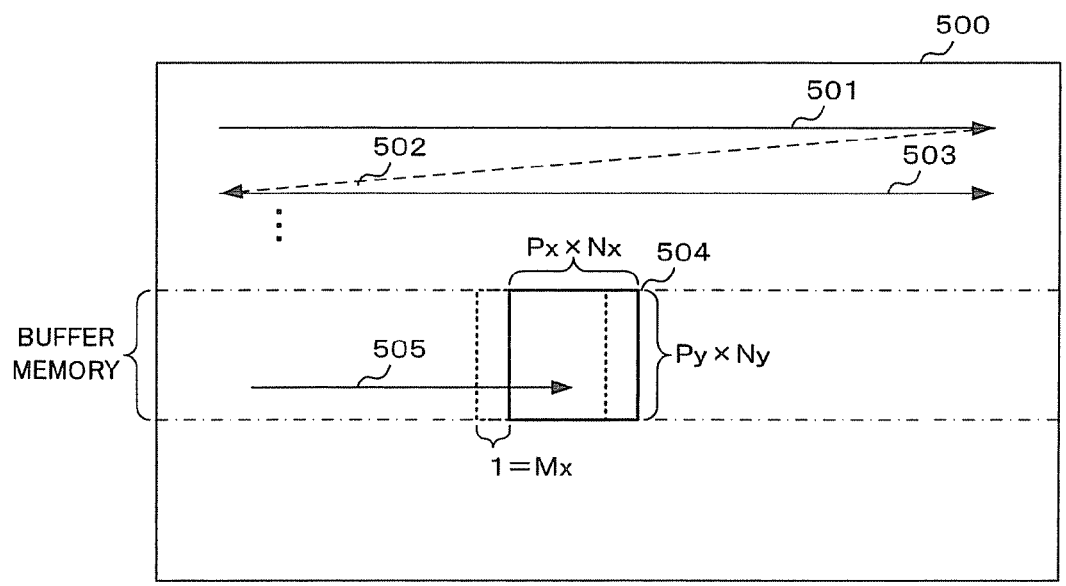
FIG. 5 is a view showing an area slice-out operation by an area reader 203.

FIG. 5 is a view showing the area slice-out operation by the area reader 203. The image scanner 101 shown in FIG. 1 scans each line on a scanning target medium. The image scanner 101 supplies an analog signal generated by its scanning to the analog-digital converter unit 102. The analog-digital converter unit 102 converts the analog signal to a digital signal. The binarizer 201 binarizes the digital signal. A memory held by the binarizer 201 stores plural lines each of the output from the binarizer 201. The first resolution converter 202 lowers the resolution of the binarized data read out from the memory held by the binarizer 201.

The area reader 203 stores data equivalent to plural lines of the data outputted from the first resolution converter 202, into the buffer memory. The area reader 203 reads out from the buffer memory an area corresponding to the size of Px×Nx pixels in the main scanning direction and Py×Ny pixels in the sub scanning direction, as an area for collation, as shown in FIG. 5. The area reader 203 reads out pixels with a shift of one pixel each of FIG. 4 in the direction of arrow 501, which is the main scanning direction. As slicing out to the right end is finished, as indicated by arrow 502, the area reader 203 reads out pixels with a shift of one pixel of FIG. 4 in the direction of arrow 503, which is the sub scanning direction.

The area reader 203 reads out a processing area 504 from the buffer memory while shifting to the right by one pixel each of the output from the first resolution converter 202. Px and Py represent the horizontal and vertical numbers of pixels outputted by the second resolution converter 204.

The shift of the slice-out area by one pixel each is referred to as increment. The shifting width in the increment is called an increment pitch.

FIG. 6 shows input data 500 of the second resolution converter 204 shown in FIG. 1. As shown in FIG. 6, the second resolution converter 204 takes pixel data of horizontally Px×Nx pixels and vertically Py×Ny pixels read out from the buffer memory by the area reader 203, as its input data 500.

The second resolution converter 204 reads out and adds Nx pixels horizontally and Ny pixels vertically each time from the top left of the input data 500 without overlap or omissions, and thus calculates the sum. The second resolution converter 204 stores the calculated sum into the memory as one pixel.

In the example shown in FIG. 6, since the pixels have values of "2", "8", "4," and "16", respectively, the sum is "30".

FIG. 7 is a view showing an exemplary output of the second resolution converter 204. As shown in FIG. 7, the second resolution converter 204 outputs a pixel block 600 of horizontal Px by vertical Py. The pixel block 600 outputted by the second resolution converter 204 is called a processing pattern. One pixel of the processing pattern is larger than the increment pitch.

The second resolution converter 204 carries out processing to generate a processing pattern every time the area reader 203 outputs a processing area.

The operation of the pattern comparator 205 shown in FIG. 2 will now be described. The pattern comparator 205 sequentially compares the processing pattern with the dictionary pattern stored in the dictionary file 206.

Any collation method may be used. For example, the pattern comparator 205 can use a square error method.

Figures 8A, 8B, 8C, 8D:
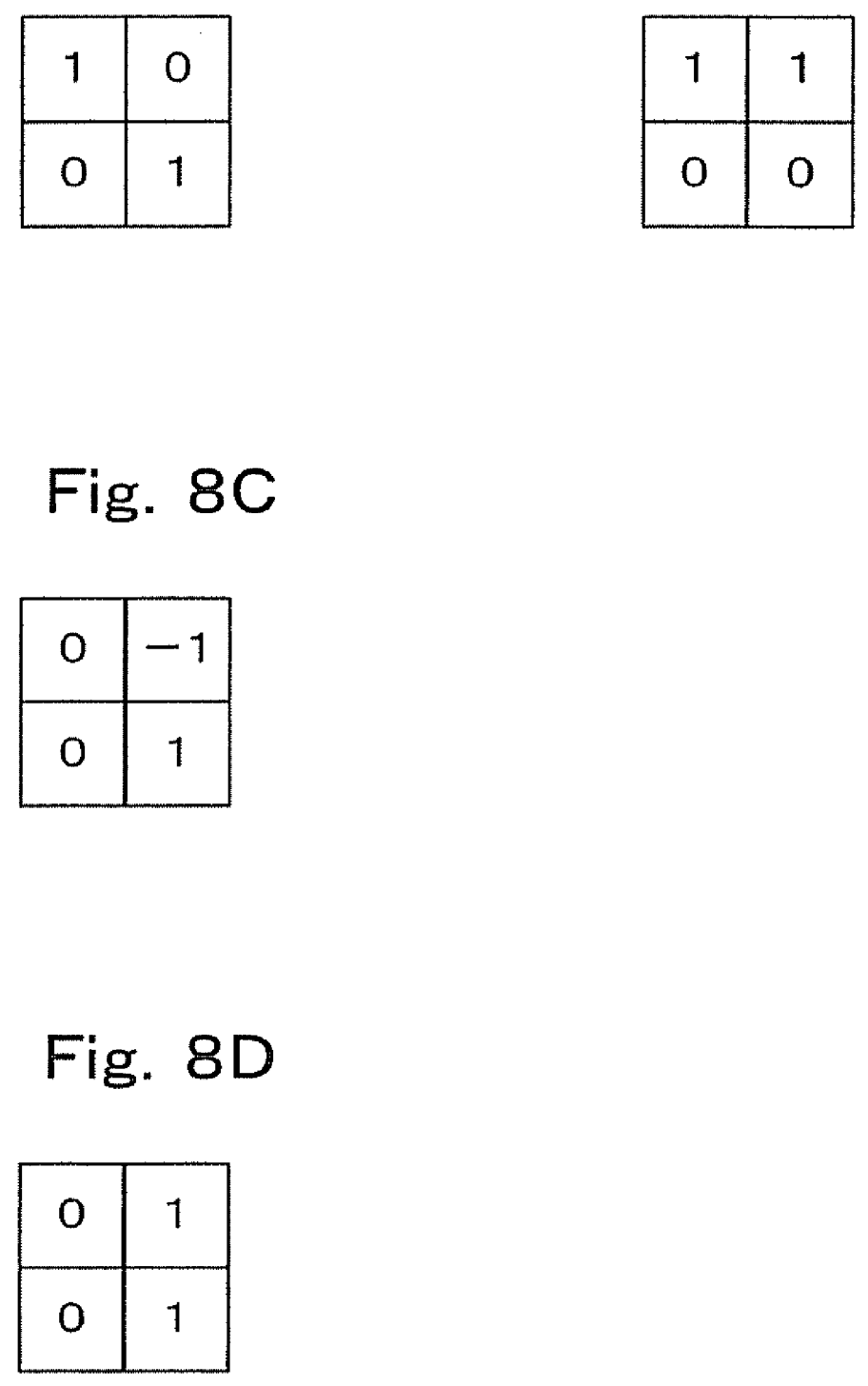

FIG. 8A to FIG. 8D are views for explaining the principle of the square error method. FIG. 8A shows an exemplary processing pattern. FIG. 8B shows an exemplary dictionary pattern.

The pattern comparator 205 calculates the difference between each pixel of the processing pattern and the pixel of the dictionary pattern located at the corresponding position. FIG. 8C shows an exemplary difference calculated by the pattern comparator 205. For example, with respect to the top right pixel, the top right in FIG. 8A is "0" and the top right in FIG. 8B is "1". Therefore, the difference between each pixel is 0−1=−1, and the top right in FIG. 8C is "−1".

Then, the pattern comparator 205 squares each pixel. FIG. 8D shows the result of squaring each pixel of FIG. 8C. The pattern comparator 205 calculates the sum of the pixels. In the example of FIG. 8D, the sum is "b 2".

The pattern comparator 205 compares the sum with a threshold value. If the sum is less than the threshold value, a determination signal "0" is outputted. If the sum is equal to or greater than the threshold value, a determination signal "1" is outputted.

Figure 9:
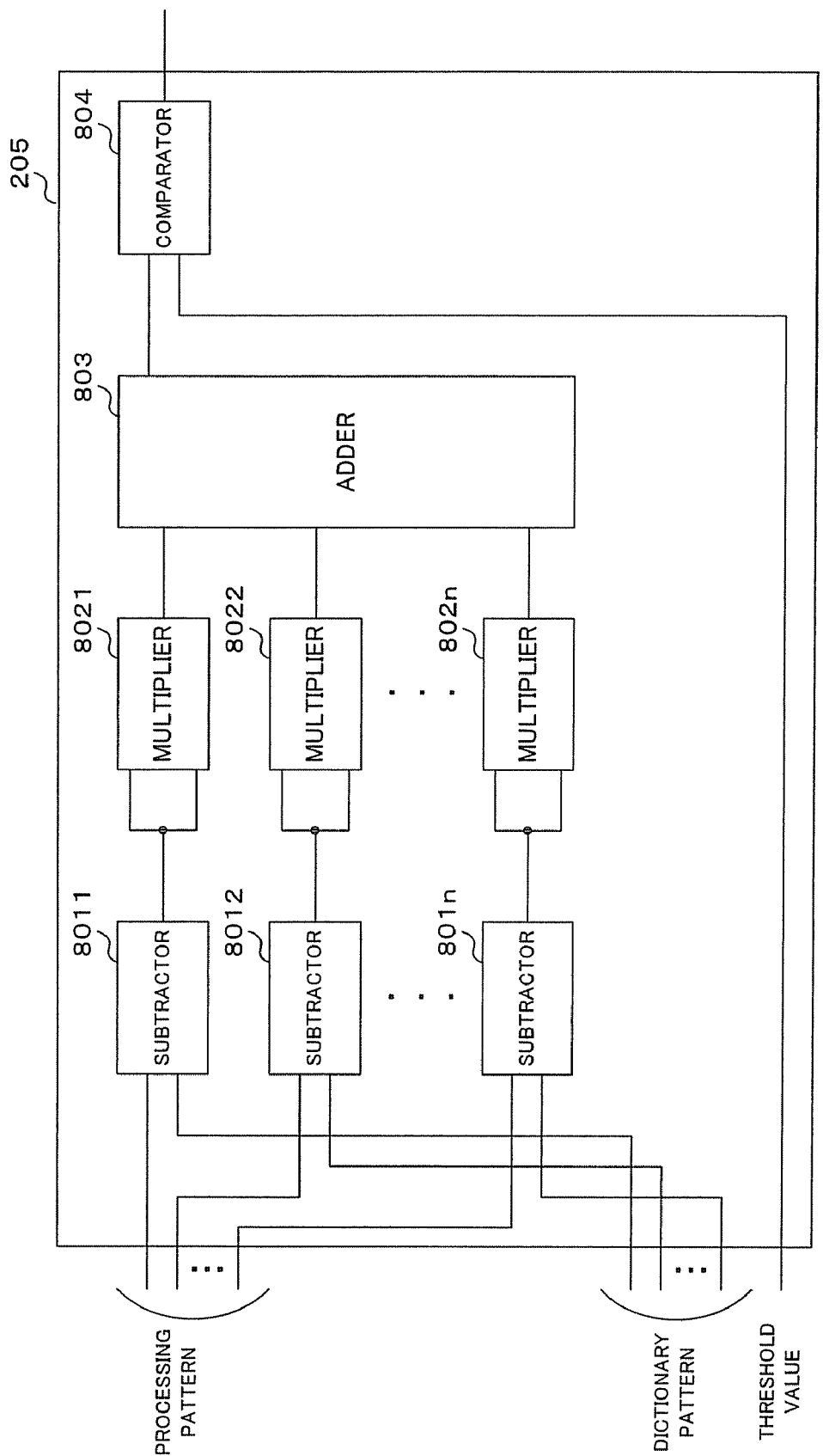
FIG. 9 is a view showing the circuit configuration of the pattern comparator using a square error method.

FIG. 9 shows an exemplary circuit configuration of the pattern comparator 205 using the square error method. As shown in FIG. 9, if the number of pixels is n, the pattern comparator 205 has n subtractors 8011 to 801n that calculate the difference between the processing pattern and the dictionary pattern, n multipliers 8021 to 802n that square the outputs of these respective subtractors, an adder 803 that calculates the sum of the output results from the multipliers 8021 to 802n, and a comparator 804 that compares the sum with a threshold value stored in the memory in advance.

Alternatively, for example, the pattern comparator 205 can use fuzzy inference. Fuzzy inference is a technique in which a dictionary pattern member function that associates a pixel value, which is the value of each pixel, with a degree of matching, is used to calculate the degree of matching from the pixel value, and the average value of the degrees of matching is compared with a threshold value, thereby performing collation determination. In the case, the dictionary file 206 stores the dictionary pattern member function for each image that should be determined.

Figure 10:
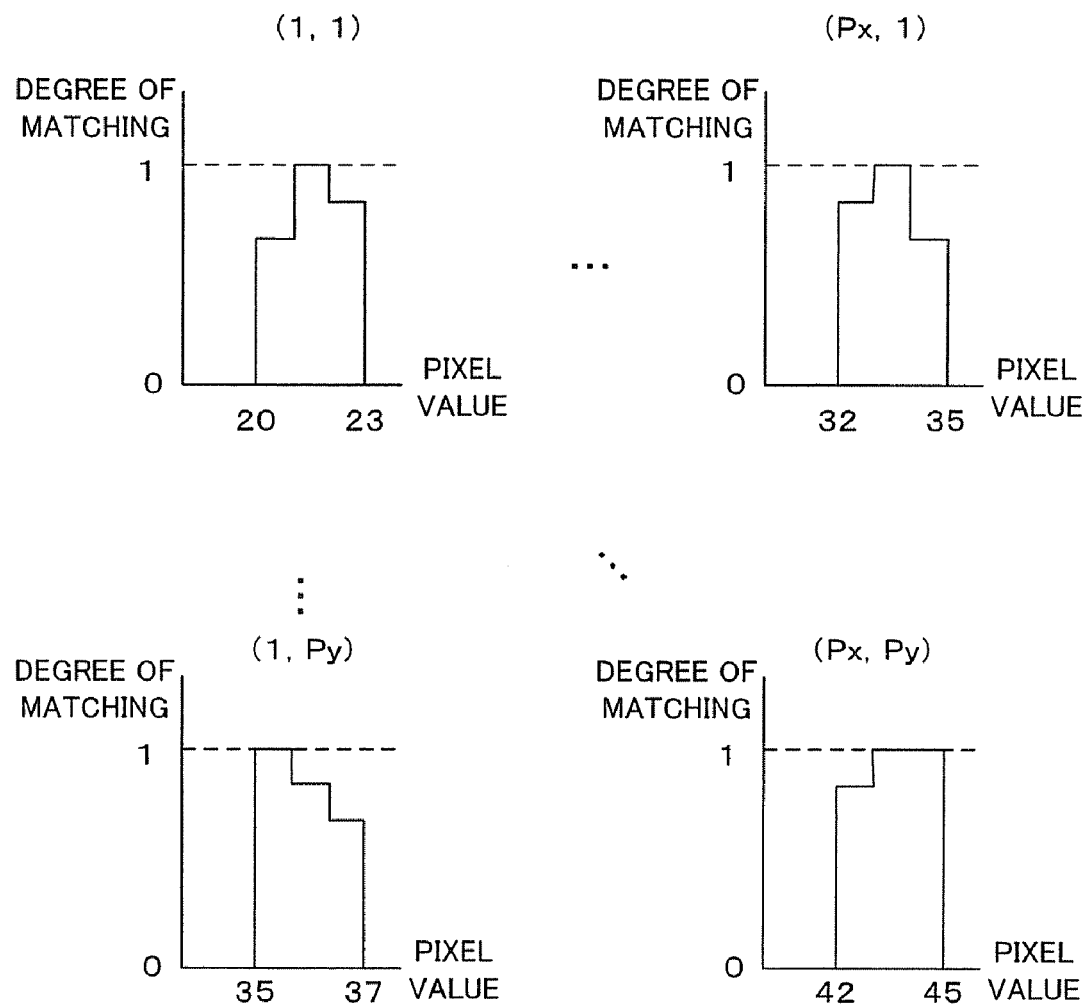
FIG. 10 is a view showing exemplary dictionary pattern member functions.

FIG. 10 shows exemplary dictionary pattern member functions. As shown in FIG. 10, if a processing pattern has Px pixels horizontally and Py pixels vertically, the dictionary file 206 stores Px×Py dictionary pattern member functions including the top left pixel (1, 1) to the bottom right pixel (Px, Py) per dictionary pattern.

The pattern comparator 205 sequentially reads out the dictionary pattern member functions and calculates the degree of matching from the pixel values by using the read-out dictionary pattern member functions. For example, if the pixel value of the pixel (Px, Py) is "45", the degree of matching is "1".

The pattern comparator 205 calculates the average value of the degrees of matching for each dictionary pattern. If the average is less than a threshold value, the pattern comparator 205 outputs "0" as a determination signal. If the average is equal to or greater than the threshold value, the pattern comparator 205 outputs "1" as a determination signal.

Figure 11:
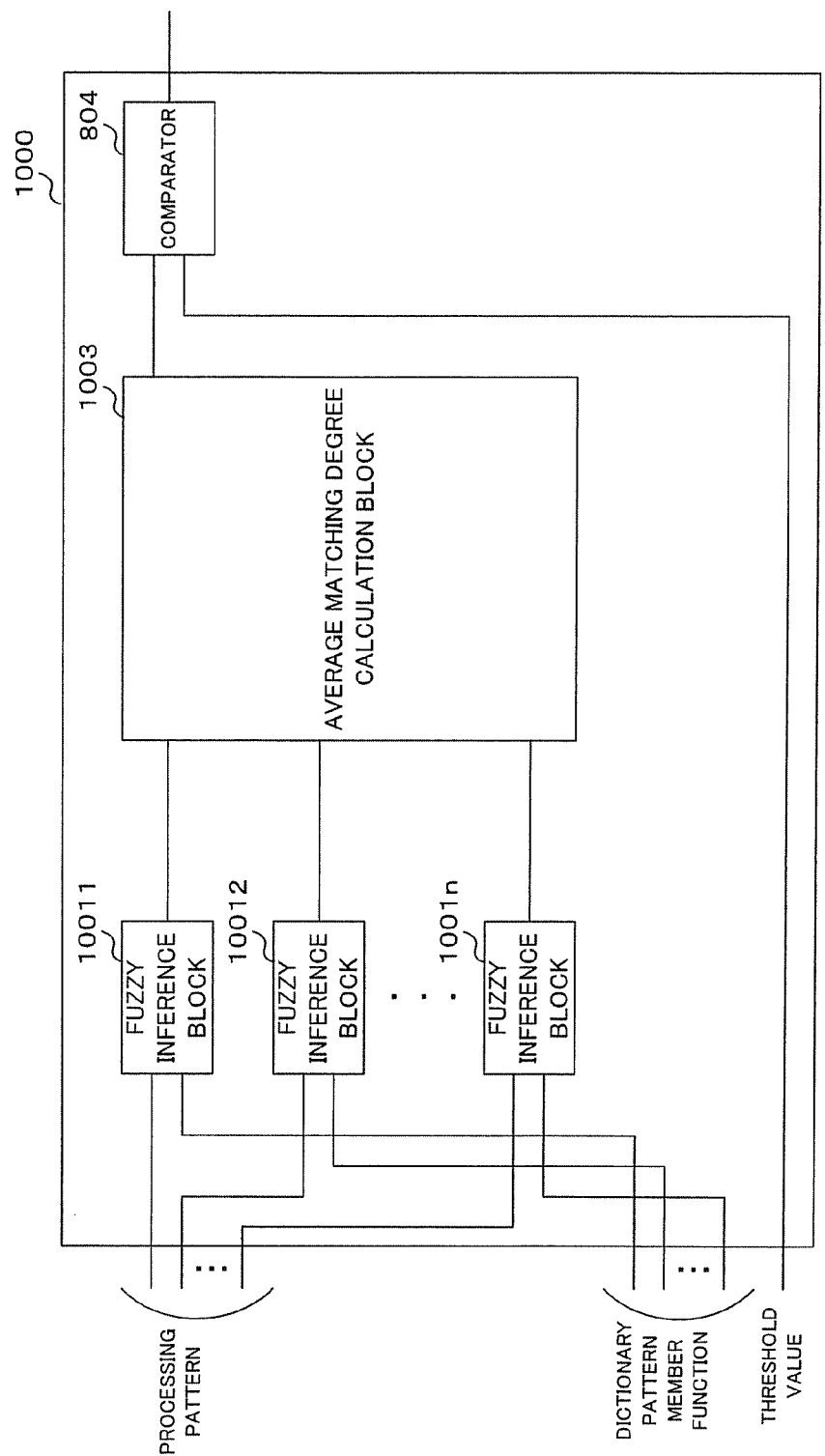
FIG. 11 is a view showing the circuit configuration of the pattern comparator using fuzzy inference.

FIG. 11 shows an exemplary circuit configuration of a pattern comparator 1000 using fuzzy inference. As shown in FIG. 11, if the number of pixels is n, the pattern comparator 1000 has n fuzzy inference blocks 10011 to 1001n that calculate the degree of matching from the pixel values by using the dictionary pattern member functions, an average matching degree calculation block 1003 that calculates an average matching degree, which is the average of the degrees of matching, and a comparator 804 that compares the average matching degree with a threshold value. The image recognition device 104 may also be configured by using an operating device such as CPU.

Figure 12:
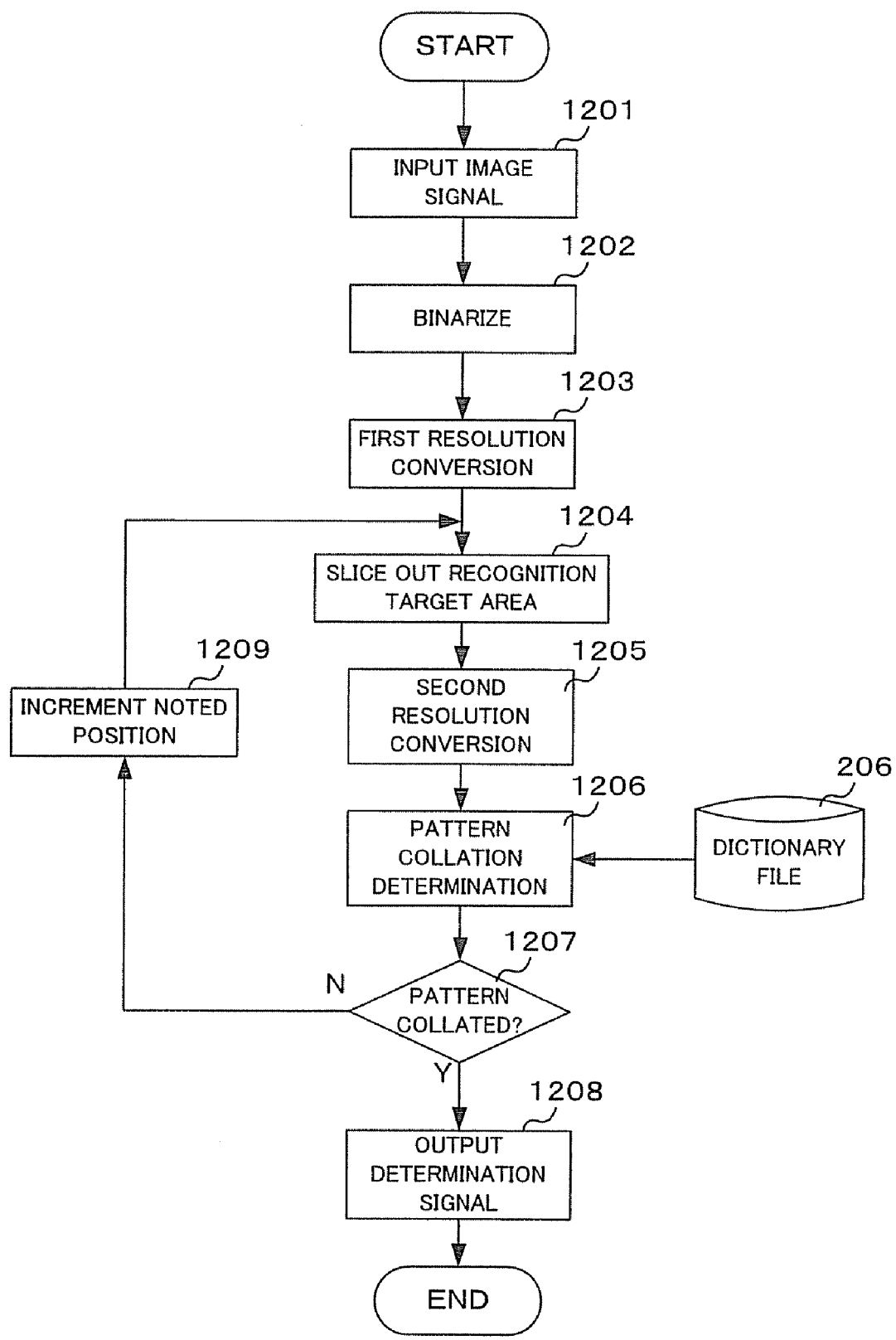
FIG. 12 is a flowchart showing the operation of the image recognition device shown in FIG. 1.

FIG. 12 is a flowchart showing the operation of the image recognition device 104. As shown in FIG. 12, in Act 1201, the image recognition device 104 inputs image signals equivalent to plural lines. That is, the image recognition device 104 reads out signals equivalent to plural lines from an output of the shading correction unit 103 stored in the memory.

In Act 1202, the image recognition device 104 carries out binarization. In Act 1203, the image recognition device 104 carries out first resolution conversion.

In Act 1204, the image recognition device 104 slices out a processing area from the image data after the first resolution conversion. That is, the image recognition device 104 specifies and reads out data of the processing area from the image data after the first resolution conversion.

More specifically, the buffer memory such as FIFO temporarily stores the image data after the first resolution conversion in Act 1204. From these stored data, the image recognition device 104 reads out, for example, (Px×Nx) pixels horizontally by (Py×Ny) pixels vertically with respect to a noted position.

In Act 1205, the image recognition device 104 carries out second resolution conversion to lower the resolution further than in the first resolution conversion with respect to the sliced-out processing area, and thus calculates a processing pattern.

In Act 1206, the image recognition device 104 carries out pattern collation determination with respect to the processing pattern after the second resolution conversion. That is, the image recognition device 104 compares the dictionary pattern of a specific image that is sequentially read out from the dictionary file 206 with the processing pattern of the image data after the second resolution conversion.

In Act 1207, if the image recognition device 104 determines that the processing pattern after the second resolution conversion coincides with the dictionary pattern of the specific image, the image recognition device 104 proceeds to Act 1208. If the image recognition device 104 determines that the processing pattern after the second resolution conversion do not coincide with each other, the image recognition device 104 proceeds to Act 1209.

In Act 1209, the image recognition device 104 increments the noted position of the slice-out area. That is, the image recognition device 104 shifts the noted position of the slice-out area, for example, by one pixel, and then returns to Act 1204.

In Act 1208, the image recognition device 104 outputs a determination signal.

As described above, the image recognition device 104 has the first resolution converter 202 that lowers resolution of an input image, the area reader 203 that reads out a processing area from an output of the first resolution converter 202, the second resolution converter 204 that lowers the resolution of the processing area sliced out by the area reader further below the resolution at the first resolution converter 202, and the pattern comparator 205.

That is, the image recognition device 104 slices out an area after lowering resolution in the first stage. The image recognition device 104 carries out pattern collation determination after lowering the resolution in the second stage further below the resolution in the first stage.

Then, the image recognition device 104 repeats the operations from lowering resolution in the first stage to pattern collation determination until a threshold value is reached in the pattern collation determination.

The image recognition device 104 may have an advantage that both high-speed operation and high determination accuracy.

Figure 13A:
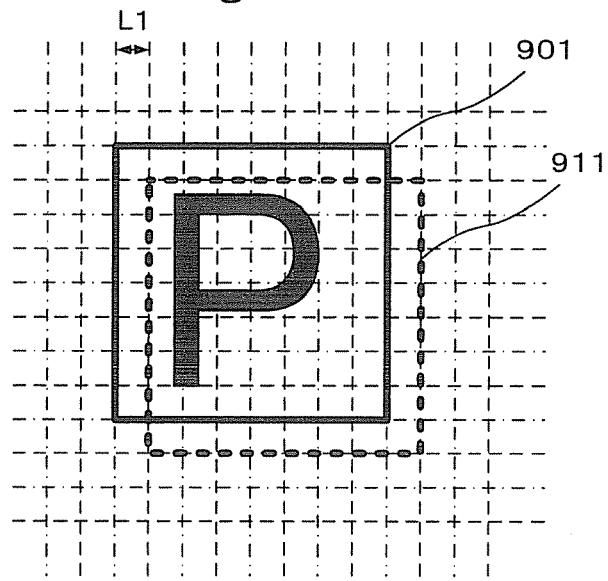
FIG. 13A is a memory pattern view showing the concept of slicing out by the area reader.
Figure 13B:
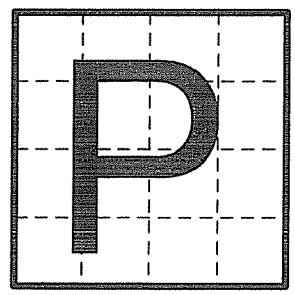
FIG. 13B is a memory pattern view showing an exemplary dictionary pattern.

More specifically, an area at a position close to the dictionary pattern can be sliced out as indicated by an area 901 shown in FIG. 13B, whereas in the conventional technique, the slice-out position shifts as indicated by an area 911 in FIG. 13A.

Figure 14:
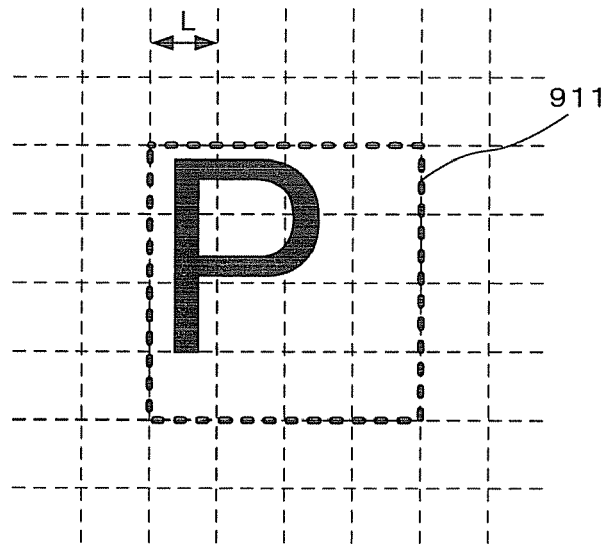
FIG. 14 is a memory pattern view showing the concept of area slicing out by a conventional technique.

The increment pitch can be reduced as indicated by L1 in FIG. 13A, while the increment pitch is large as indicated by L in FIG. 14 in the conventional technique.

Although exemplary embodiments are shown and described, it will be apparent to those having ordinary skill in the art that a number of changes, modifications, or alterations to the invention as described herein may be made, none of which departs from the spirit of the present invention. All such changes, modifications, and alterations should therefore be seen as within the scope of the present invention.

What is claimed is:

1. An image recognition device comprising:
   a first resolution converter that lowers resolution of binarized image data;
   an area reader that reads out a processing area from an output of the first resolution converter;
   a second resolution converter that generates a processing pattern having lower resolution than in the first resolution converter, from the processing area read out by the area reader;
   a dictionary file that stores a dictionary pattern, which is pattern data of a specific image as a determination target; and
   a pattern comparator that sequentially reads out the dictionary pattern and compares the dictionary pattern with the processing pattern to generate a determination signal.

2. The device according to claim 1, wherein the area reader reads out the processing area from the output of the first resolution converter while incrementing the processing area by one pitch each.

3. The device according to claim 2, wherein the pitch of increment by the area reader is smaller than one pixel of the processing pattern.

4. The device according to claim 1, wherein the pattern comparator compares the processing pattern with the dictionary pattern by a square error method.

5. The device according to claim 1, wherein
   the area reader reads out a processing area from an output of the first resolution converter while incrementing the processing area by one pitch each;
   the pattern comparator sequentially reads out the dictionary pattern and compares the difference between the dictionary pattern and the processing pattern with a threshold value;
   wherein the increment and reading out of the processing area by the area reader, the generation of the processing pattern by the second resolution converter, and the collation by the pattern comparator are repeated until the comparator determines that the dictionary pattern matches the processing pattern.

6. The device according to claim 1, wherein
   the dictionary file stores a dictionary pattern member function, which is a member function of a specific image as a determination target; and
   the pattern comparator sequentially reads out the dictionary pattern member function and compares the dictionary nary pattern member function with the processing pattern by using fuzzy inference.

7. The device according to claim 6, wherein the dictionary file stores a member function of each pixel for each specific image.

8. An image scanning apparatus comprising:
   an image scanner that converts an image taken in by an optical method to an electric signal and outputs the electric signal;
   an analog-digital converter unit that performs analog-digital conversion of the signal from the image scanner and outputs the digital signal;
   an image recognition device that determines whether a specific image is included in an input image or not; and
   a control unit that controls operation of the image scanner in accordance with a result of determination from the image recognition device,
   the image recognition device comprising:
   a first resolution converter that lowers resolution of binarized image data;
   an area reader that reads out a processing area from an output of the first resolution converter;
   a second resolution converter that generates a processing pattern having lower resolution than in the first resolution converter, from the processing area read out by the area reader;
   a dictionary file that stores a dictionary pattern, which is pattern data of a specific image as a determination target; and
   a pattern comparator that sequentially reads out the dictionary pattern and compares the dictionary pattern with the processing pattern.

9. The apparatus according to claim 8, wherein the area reader reads out the processing area from the output of the first resolution converter while incrementing the processing area by one pitch each.

10. The apparatus according to claim 9, wherein the pitch of increment by the area reader is smaller than one pixel of the processing pattern.

11. The apparatus according to claim 8, wherein the pattern comparator compares the processing pattern with the dictionary pattern by a square error method.

12. The apparatus according to claim 8, wherein if the pattern comparator determines that a specific image is included in an input image, the control unit controls to stop scanning of the image scanner.

13. The apparatus according to claim 8, wherein
   the dictionary file stores a dictionary pattern member function, which is a member function of a specific image as a determination target; and
   the pattern comparator sequentially reads out the dictionary pattern member function and compares the dictionary pattern member function with the processing pattern by using fuzzy inference.

14. The apparatus according to claim 13, wherein the dictionary file stores a member function of each pixel for each specific image.

15. An image recognition method for an image recognition device comprising:
   lowering resolution of binarized image data by a first resolution converter;
   reading out a processing area from the binarized image data by an area reader;
   generating, by a second resolution converter, a processing pattern having lower resolution than in the first resolution converter, from the processing area read out by the area reader; and from a dictionary file that stores a dictionary pattern, which is pattern data of a specific image as a determination target, sequentially reading out the dictionary pattern and collating the dictionary pattern with the processing pattern by a pattern comparator.

16. The method according to claim 15, wherein the area reader reads out the processing area from the output of the first resolution converter while incrementing the processing area by one pitch each.

17. The method according to claim 16, wherein the pitch of increment by the area reader is smaller than one pixel of the processing pattern.

18. The method according to claim 15, wherein the pattern comparator compares the processing pattern with the dictionary pattern by a square error method.

19. The method according to claim 15, wherein from a dictionary file that stores a dictionary pattern member function, which is a member function of a specific image as a determination target, sequentially reading out the dictionary pattern member function and collating the dictionary pattern member function with the processing pattern by the pattern comparator using fuzzy inference.

20. The method according to claim 19, wherein the dictionary file stores a member function of each pixel for each specific image.

* * * * *